US005501373A

United States Patent [19]

Galli

[11] Patent Number: 5,501,373

[45] Date of Patent: Mar. 26, 1996

[54] ATOMIZING DISPENSER FOR ENDONASAL DRUG SPRAY ADMINISTRATION

[75] Inventor: Rosaria Galli, Genoa, Italy

[73] Assignee: R.G.s.a.s.di Rosaria Galli & C, Italy

[21] Appl. No.: 190,112

[22] PCT Filed: Jul. 30, 1992

[86] PCT No.: PCT/IT92/00090

§ 371 Date: Jun. 17, 1994

§ 102(e) Date: Jun. 17, 1994

[87] PCT Pub. No.: WO93/02804

PCT Pub. Date: Feb. 18, 1993

[30] Foreign Application Priority Data

Aug. 2, 1991 [IT] Italy .................................. 91A000102

[51] Int. Cl.[6] ...................................................... G01F 11/00

[52] U.S. Cl. ............................................ 222/386; 239/320

[58] Field of Search .................................... 222/320, 386; 604/207, 208, 209, 210, 211; 128/200.14; 239/320

[56] References Cited

U.S. PATENT DOCUMENTS

| | | | |
|---|---|---|---|
| 2,474,496 | 6/1949 | Rayman | 604/210 |
| 2,764,981 | 10/1956 | Helmer et al. | 604/210 |
| 2,869,541 | 1/1959 | Helmer et al. | 604/210 |
| 3,563,240 | 2/1971 | Silver | 604/211 X |
| 4,344,573 | 8/1982 | DeFelice | 239/320 |
| 4,475,905 | 10/1984 | Himmelstrup | 604/208 |
| 4,923,448 | 5/1990 | Ennis, III | 128/200.14 |
| 4,946,069 | 8/1990 | Fuchs | 604/210 X |
| 4,962,868 | 10/1990 | Borchard | 222/386 X |
| 5,257,726 | 11/1993 | Graf et al. | 222/386 X |
| 5,289,818 | 3/1994 | Citterio et al. | 128/200.14 |

FOREIGN PATENT DOCUMENTS

| | | | |
|---|---|---|---|
| 021123 | 1/1981 | European Pat. Off. . | |
| 191655 | 1/1923 | United Kingdom | 222/320 |
| 1225495 | 3/1971 | United Kingdom . | |

*Primary Examiner*—Andres Kashnikow
*Assistant Examiner*—Kenneth Bomberg
*Attorney, Agent, or Firm*—Rosenman & Colin

[57] ABSTRACT

An atomizing dispenser for endonasal spray administration of drug solutions is disclosed. The dispenser comprises a main body, or slider (1), a piston/pump (12) axially slidable into a drug container (5), and a housing/button (3). The stem (4) of the piston/pump (12) has two grooves or seats (6) and (7), each retaining the resilient detent rings (8) and (9) which oppose and control the piston/pump (12) run. These detent rings require the user's hand to supply energy sufficient to force the resilient detent rings (8) and (9) to expand so as to snap out from their grooves/seats (6) and (7), one after the other. Thus the piston (12) run and the consequent atomized spray application is divided into two separate deliveries which the user can administer as one for each nostril, the snap allowing an instant release of the accumulated energy on the piston/pump (5). Consequently, this dispenser provides servo-assisted, perfect atomization of the drug solution.

7 Claims, 2 Drawing Sheets

ATOMIZING DISPENSER FOR ENDONASAL DRUG SPRAY ADMINISTRATION

BACKGROUND OF THE INVENTION

In the pharmaceutical field, specific packs for endonasal atomized administration of drugs have been developed for single use and for multiple use. These container/dispenser packs are all manually actuated by the user's depression of a slider. This slider requires a rapid, strong action, otherwise the spray jet is not properly atomized.

This rapid and strong action is not achievable by certain patients. Therefore the drug is not properly delivered and looses its effectiveness.

Furthermore, in using single-use packs, which are now very popular due to the easier calculation of the number of administrations in a given time period, it is impossible to spread the delivery into two administrations, one for each nostril. However, this subdivided delivery is the most effective and, therefore, the most advisable.

Thus the administration of these drugs requires 1) the calculation of the number of deliveries in a time period, 2) the delivery of each administration subdivided between the two nostrils and 3) a perfect atomization independent from the speed and strength of the user's actuation of the dispenser.

Known multiple-use devices solve the twin-delivery problem, the single-use devices solve the calculation problem, but neither of the two solves the atomization problem. Thus, to facilitate dispenser use and to avoid incorrect delivery, a spray dispenser able to provide a drug administration subdivided into two half deliveries, one for each nostril, combined with an easier activation of the atomizing device is required. That is, a partially servo-assisted atomization that is not completely dependent on the speed and the strength of the user's action is required. This need has suggested a study of the problem to develop a twin-dose dispenser or, better, one providing a subdivided administration, first into one nostril and then into the other, with means to improve and assure atomization.

SUMMARY OF THE INVENTION

This study has been completed. The result is very satisfactory, both from the use and from the production cost point of view, and the features and the details of the dispenser pack that resulted are described below.

The container/dispenser pack for drugs requiring atomized endonasal administration comprises a main body acting, as usual, as a slider and provided with radial, planar grip extensions for two finger tips of the user's hand. The slider incorporates in its upper part the atomizing nozzle and in its lower part a protruding cylindrical neck within which is an axially slidable cup-shaped housing, which acts as a control button adapted to be pressed by the user's thumb tip.

Said cup-shaped housing encloses a cylindrical drug solution container incorporating an axially-slidable piston/pump comprising a stem provided with two separate, slotted grooves with respective concave bottoms, said grooves each being adapted to receive a resilient detent ring having a radial cut. These two resilient detent rings, which can, under the force exerted by the user's fingers, snap out from their receiving grooves, one after the other, control the piston run, breaking it into two half runs in the case of the twin-use version.

Furthermore, the slight effort required to make each of the two resilient detent rings snap out from their seats accumulates the correct amount energy in the user's fingers, which is instantly released as each snaps out to provide the right speed of activation for the best atomization in any condition.

Thus, an endonasal spray dispenser in accordance with the present invention comprises a pump chamber having radial extensions for gripping and pressing the dispenser and a piston axially slidable in the pump chamber. The pump chamber is tubular and has an opening at the lower end for receiving the piston, and is in fluid connection with an atomizing nozzle at the upper end of the chamber. The dispenser further comprises a detent adapted to resist the axial sliding of the chamber pst a given point along the piston. This detent cooperates with the piston and with the chamber so that sliding of the chamber along the piston until sufficient force is applied so that the piston and the chamber snap past the detent. In this way, adequate force for properly dispensing the solution is assured.

BRIEF DESCRIPTION OF THE DRAWINGS

The accompanying drawings show, in different scales, nonlimiting examples of a basic embodiment of the invention and some of the possible modifications. In these drawings.

DETAILED DESCRIPTION OF THE PREFERRED EMBODIMENTS

Figure 1:
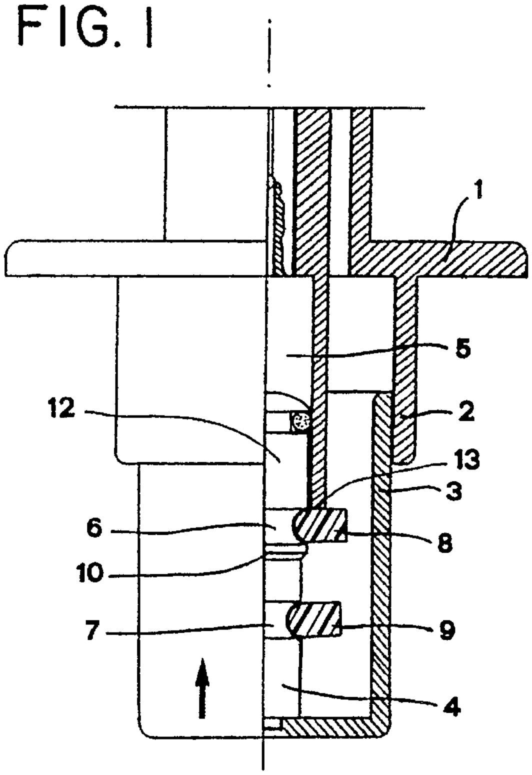
FIG. 1 is a cutaway side elevation with a partial axial sectional view of the lower part of the container/dispenser assembly in accordance with the present invention prior to the first actuating stroke, when the upper resilient detent ring is abutting against the cylindrical neck of the drug container and is still in its seat.

As clearly shown in FIG. 1, the container/dispenser for endonasal atomized administration in accordance with the invention substantially comprises a main body, or slider, having radial planar extensions for finger actuation by gripping and depressing the dispenser, and an upper, protruding tubular cylinder having the atomizing nozzle (not shown) on the top thereof. Protruding from the lower part of said slider 1 is a cylindrical neck 2, within which is axially slidable the cup-shaped button/housing element 3 bearing against its bottom end the lower end of the stem 4 of a piston/pump 12 which is axially slidable into the liquid drug container 5. The stem 4 of the piston/pump 12 has two different diameters, the larger being the upper one and the smaller, the lower one.

Figure 2:
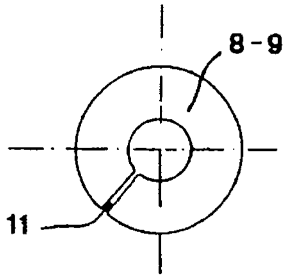
FIG. 2 is a plan view of one of the resilient detent rings provided with the elasticity enhancing radial cut.

On each of the two diameters the stem 4 is provided with concave-bottom circular grooves 6 and 7 in which are seated the two resilient detent rings 8 and 9. The bottom of the upper groove 6, and therefore also the interior diameter of the upper resilient detent ring 8 is larger than the corresponding diameter of the groove 7 and the ring 9, and is also slightly larger than that of the lower part of the stem 4 of the piston/pump 12. The two diameters of the stem 4 are linked by the bevel 10 which allows the resilient detent ring 8 to snap better and the manufacturing process to assemble the ring into the groove 6 more easily. The two resilient detent rings 8 and 9 are both provided with an elasticity-enhancing radial cut 11, as shown in FIG. 2.

The unit comprising the piston/pump 12 and its stem 4 provided with the grooves 6 and 7 bearing the resilient detent rings 8 and 9, and the edge 13 of the container 5, constitute the servo-assist device that grants a safer, perfect atomization and the control system providing two deliveries or one delivery divided into two halves. The operation of the system is described hereinafter with particular reference to FIGS. 1, 3 and 4.

In the position shown in FIG. 1 the upper resilient detent ring 8 abuts the lower edge 13 of the container 5. When the button/housing 3 is pressed as indicated by the arrow to obtain the first drug delivery, the pressure is transmitted to the piston/pump 12 having the end of its stem 4 resting against the bottom of the button/housing 3. In this condition the movement of the piston/pump 12 is opposed by the resilient detent ring 8 abutting the edge 13 of the container 5.

Figure 3:
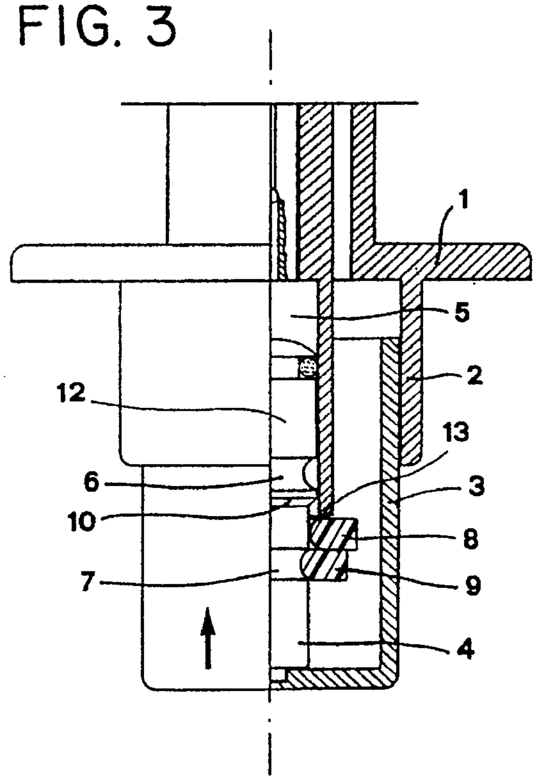
FIG. 3 is a view similar to FIG. 1, after the first actuation stroke has occurred, when the upper resilient detent ring has snapped out from its seat and now rests against the lower detent ring, which now acts as an end stop to the first half-run of the piston/pump.

In order to obtain the first delivery of drug it is necessary to exert enough pressure to make the resilient detent ring 8 expand and, therefore, snap out from the groove 6 and slide downward until it is stopped by the resilient detent ring 9 still in the other groove 7, thus allowing the piston/pump 12 to make the first half run inside the container 5, as shown in FIG. 3. Said pressure is preset by the elasticity of the resilient detent ring 8. This resilient ring produces an accumulation of energy in the user's hand, which is instantly released when the resilient detent ring 8 snaps out from the groove 6.

Figure 4:
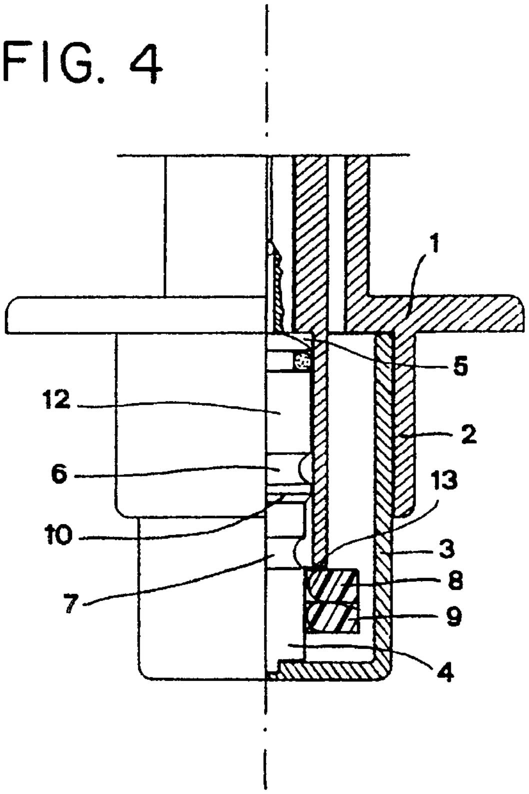
FIG. 4 is a view similar to FIGS. 1 and 3, after the second and last actuation stroke has occurred, when the second, lower ring has also snapped out from its seat, allowing the second half-run to be performed with the proper servo-assisted speed.

To obtain the second delivery the same operation is merely repeated. The resilient detent ring 9 provides the same resistance as that previously provided by the ring 8 and, again, requires enough energy accumulated in the user's hand to snap the ring 9 out from the groove/seat 7, as shown in FIG. 4. The instant release of the accumulated energy will, again, produce the best atomization, and do so independent of speed with which the user can depress the slider 1 into the housing/container 3.

Figure 5:
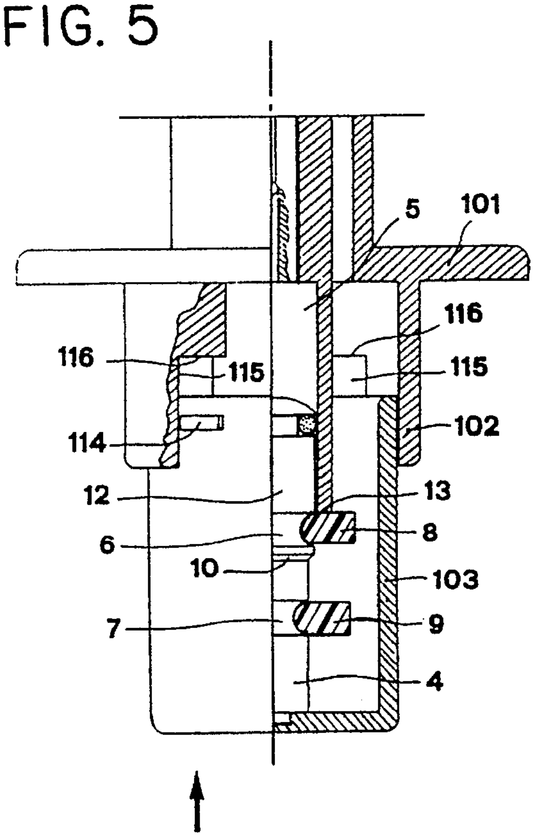
FIG. 5 is a view similar to FIG. 1 of a slightly modified embodiment showing a housing/button and slider provided with auxiliary stop elements.
Figure 6:
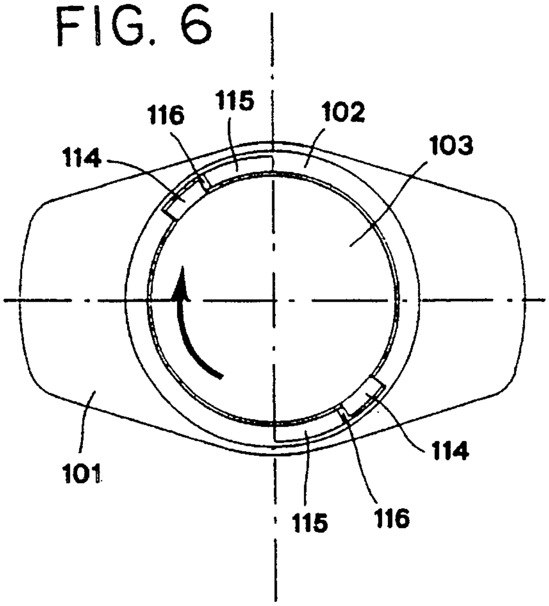
FIG. 6 is a plan view of the bottom of the embodiment shown in FIG. 5.

FIGS. 5, 6, 7 and 8 show a modification wherein the housing/container 103 is provided with two stop protrusions 114. The protruding neck 102 of the slider 101 has two vertical slots 115, each comprising a stop shoulder 116, as shown in FIGS. 5 and 6. All the other parts and functions remain unchanged in respect to the basic embodiment.

Figure 7:
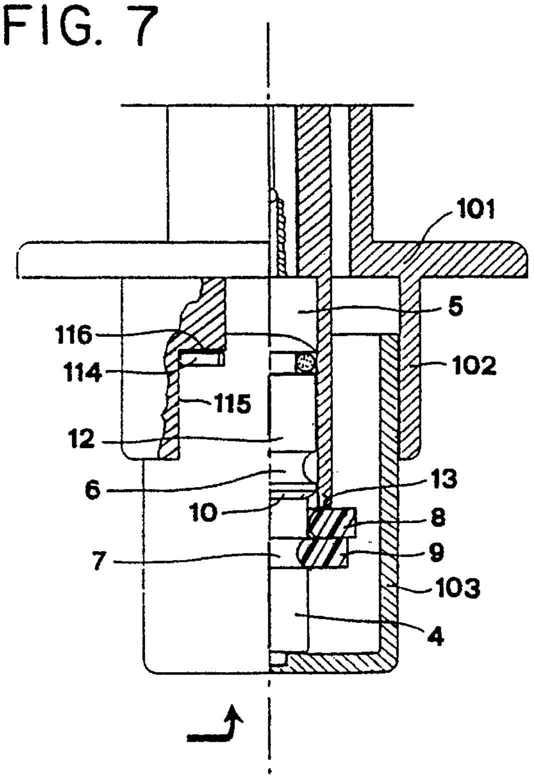
FIG. 7 is a view similar to FIG. 3 of the embodiment shown in FIG. 5, at the end of the first actuating stroke.
Figure 8:
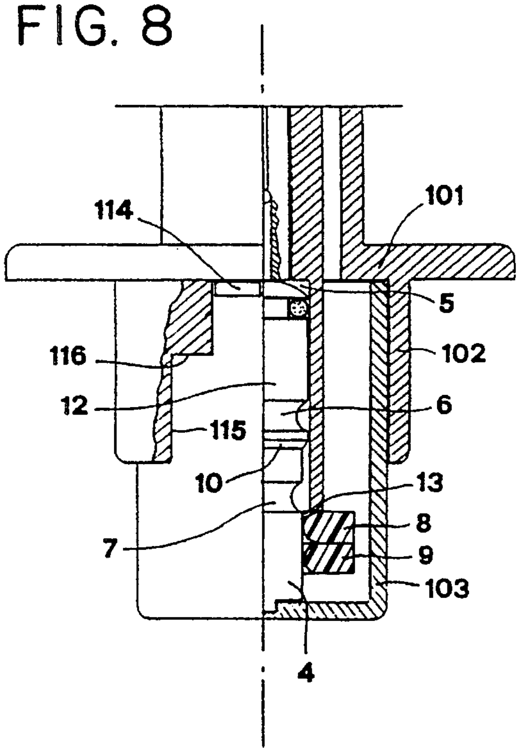
FIG. 8 is a view similar to FIG. 4 of the embodiment shown in FIG. 5 after the second, the last actuation stroke has occurred.

As shown in FIG. 7, the run of the housing/container 113 and therefore of the piston/pump 12 is stopped at the end of the first stroke, not only by detent action of the resilient detent ring 9 against the ring 8, but also by the detent action exerted by the shoulders 116 against the protrusions 114 of the housing/container 113. To allow a second stroke, it is first necessary to turn the housing/container 113 as indicated by the arrows in FIGS. 6 and 7, in order to remove the shoulder 116 from abutment against the protrusion 114, and then to depress it as previously described. This modification improves the safety in the control of the first stroke run and avoids any accidental possibility to delivery the two doses within the same activation stroke.

Obviously, further modifications are possible within the basic principle of the invention. For example, grooves/seats retaining the resilient detent rings could be made on the inner walls of the housing/button 3 with the same functions and working principle of those made on the stem 4 of the piston/pump 12. Furthermore, the basic principle of the invention does not exclude the possibility of replacing the grooves/seats and the resilient detent rings with suitable ledges protruding from the outer walls of the housing/button 3, said protrusions abutting against the edge of the neck 2 of the slider 1 and being properly preconditioned with notches to self-shear and detach in response to a preset force of activation of the dispenser, therefore also in this case providing the energy accumulation and the subsequent snap necessary for correct atomization. Similarly, said abutting protrusions could be replaced by elastic elements in one piece with the housing/button 3 or with the neck 2 of the slider 1 that are enabled to bend by means of suitable slits. It should be noted that the described device and its possible modifications can also have a single-use version, with only one resilient detent ring or element, that also produces a perfect, servo-assisted atomization. The invention is defined by the appended claims.

What is claimed is:

1. An atomizing dispenser for dispensing a solution as an endonasal spray, said dispenser comprising:

- a tubular pump chamber, having first and second ends, said pump chamber being affixed to radial extensions for gripping and pressing the dispenser, said tubular chamber having an opening at the first end of the chamber and being in fluid connection with an atomizing nozzle at the second end of the chamber;
- a piston slidable in an axial direction in said pump chamber, said piston including a control button at a lower end; and
- a detent adapted to resist axial sliding of the piston relative to the chamber past a given point, wherein said detent is a ring adapted to be seated in a groove on one of the piston or chamber, and wherein said ring has an opening therein, said detent cooperating with said chamber and said piston to prevent movement of the chamber relative to the piston until sufficient compressive force is applied to the piston, relative to the chamber, to cause the piston and chamber to snap past the detent, whereby adequate force for dispensing the solution is provided.

2. The dispenser according to claim 1, wherein the dispenser is adapted to provide multiple doses and at least one additional detent is provided on one of the piston or chamber, said additional detent being spaced from the other detent relative to said axial direction so that the detents act sequentially, whereby adequate force for dispensing each dose is assured.

3. The dispenser according to claim 2, wherein said additional detent is a ring adapted to be seated in a respective additional groove on one of the piston or the chamber and wherein diameters of the rings and diameters contacted by the rings of the grooves respectively, are graduated so that the force required for the piston to slide past each respective detent is the same.

4. The dispenser according to claim 1, wherein said piston has first and second sections, said sections having respective different diameters, and said groove and additional groove is on each section of said piston.

5. The dispenser of claim 1, wherein said chamber is situated in a body having an open neck at the first end of said chamber and said piston is inserted in a tubular housing, said tubular housing being slidably received inside said neck.

6. The dispenser of claim 5, wherein a stop protrusion on one of said neck and said housing engages a shoulder on the other of said neck and said housing so that said piston and said chamber cannot be pushed past said detent until the neck and the housing have been rotated to release the stop protrusion from the shoulder.

7. The dispenser of claim 6 further comprising a second detent on one of the piston or chamber, said additional detent being spaced from the other detent relative to said axial direction so that the detents act sequentially, and an axial slot adapted to permit the stop protrusion to pass from said shoulder to a second shoulder on the other of said neck and said housing, so that said stop protrusion travels along said slot to the second shoulder when said piston and said chamber slide past the first detent.

* * * * *